(12) United States Patent
Li et al.

(10) Patent No.: US 11,363,358 B2
(45) Date of Patent: Jun. 14, 2022

(54) USER EQUIPMENT AND METHOD FOR OUTPUTTING AUDIO

(71) Applicant: Beijing Xiaomi Mobile Software Co., Ltd., Beijing (CN)

(72) Inventors: Xiaoshuang Li, Beijing (CN); Shiwei Lu, Beijing (CN); Zhengrong Lv, Beijing (CN); Zhaoqian Xu, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 0 days.

(21) Appl. No.: 16/818,729

(22) Filed: Mar. 13, 2020

(65) Prior Publication Data
US 2021/0152906 A1 May 20, 2021

(30) Foreign Application Priority Data
Nov. 15, 2019 (CN) .......................... 201911121654.9

(51) Int. Cl.
*H04R 1/02* (2006.01)
*H04R 1/24* (2006.01)

(52) U.S. Cl.
CPC ............... *H04R 1/025* (2013.01); *H04R 1/24* (2013.01); *H04R 2499/15* (2013.01)

(58) Field of Classification Search
None
See application file for complete search history.

(56) References Cited

U.S. PATENT DOCUMENTS

| 6,151,401 | A | * | 11/2000 | Annaratone | G06F 1/1616 361/679.23 |
|---|---|---|---|---|---|
| 6,997,525 | B2 | | 2/2006 | Gillengerten | |
| 8,369,561 | B2 | * | 2/2013 | Bhutani | H04R 5/02 381/395 |
| 2004/0135476 | A1 | | 7/2004 | Gillengerten | |
| 2005/0146251 | A1 | | 7/2005 | Gillengerten | |

(Continued)

FOREIGN PATENT DOCUMENTS

| CN | 205622751 U | 10/2016 |
|---|---|---|
| CN | 109462804 A | 3/2019 |

(Continued)

OTHER PUBLICATIONS

Lee, English translation of KR 20100004541 A, Jan. 13, 2010.*

(Continued)

*Primary Examiner* — Paul W Huber
(74) *Attorney, Agent, or Firm* — Finnegan, Henderson, Farabow, Garrett & Dunner L.L.P.

(57) ABSTRACT

User equipment (UE) includes a housing, an audio output module, and a drive module connected to the audio output module. The drive module is configured to drive the audio output module to move along a straight line between a first location and a second location. The first location is inside the housing. The second location is outside the housing. When the audio output module is in an audio output state, the drive module is configured to drive the audio output module to move along the straight line to the second location. When the audio output module exits the audio output state, the drive module is configured to drive the audio output module to move along the straight line to the first location.

7 Claims, 14 Drawing Sheets

(56) References Cited

U.S. PATENT DOCUMENTS

| | | | | |
|---|---|---|---|---|
| 2007/0274547 A1* | 11/2007 | Ueno | ................ | H04R 5/02 |
| | | | | 381/306 |
| 2013/0230202 A1* | 9/2013 | Widner | ................ | H04R 5/02 |
| | | | | 381/333 |
| 2014/0348366 A1* | 11/2014 | Eaton | ................ | H04R 7/045 |
| | | | | 381/334 |
| 2020/0099883 A1* | 3/2020 | Buck | ................ | H04N 5/2257 |

FOREIGN PATENT DOCUMENTS

| | | | |
|---|---|---|---|
| CN | 109769098 | A | 5/2019 |
| JP | 2001-169377 | A | 6/2001 |
| JP | 2002-359890 | A | 12/2002 |
| KR | 20100004541 | A | 1/2010 |
| KR | 20140010834 | A | 1/2014 |

OTHER PUBLICATIONS

Ku, English translation of KR20140010834 A, Jan. 27, 2014. (Year: 2014).*
Supplementary European Search Report in European Application No. 20166022.2, dated Jul. 6, 2020.
International Search Report in International Application No. PCT/CN2020/074277, dated Aug. 6, 2020.
Written Opinion of International Search Authority in International Application No. PCT/CN2020/074277, dated Aug. 6, 2020.
Notice of Reasons for Refusal dated Feb. 1, 2022, from the Japanese Patent Office issued in counterpart Japanese Application No. 2020-515151.

* cited by examiner

USER EQUIPMENT AND METHOD FOR OUTPUTTING AUDIO

CROSS-REFERENCE TO RELATED APPLICATIONS

This application is based on and claims priority to Chinese Application No. 201911121654.9 filed on Nov. 15, 2019, the content of which is incorporated by reference in its entirety.

BACKGROUND

With continuous development of user equipment (UE) and advance of science and technology, UE tends to be smart and have diversified functions. Design of a functional module in existing UE may not meet user demands. For example, a speaker in a conventional TV set is fixedly arranged in a housing of the TV set, which may fail to meet user demands.

SUMMARY

According to a first aspect, user equipment (UE) includes: a housing, an audio output module, and a drive module connected to the audio output module. The drive module is configured to drive the audio output module to move along a straight line between a first location and a second location. The first location is located inside the housing. The second location is located outside the housing. The drive module is configured to, in response to the audio output module being in an audio output state, drive the audio output module to move along the straight line to the second location. The drive module is configured to, in response to the audio output module exiting the audio output state, drive the audio output module to move along the straight line to the first location.

According to a second aspect, a method for outputting audio includes: detecting an audio output state of an audio output module in user equipment (UE); in response to the audio output module being in the audio output state, driving, via a drive module, the audio output module to move along a straight line from a first location inside a housing of the UE to a second location outside the housing; outputting, via the audio output module at the second location, an audio signal; and in response to the audio output module exiting the audio output state, driving, via the drive module, the audio output module to move along the straight line from the second location to the first location.

According to a third aspect, a device for outputting audio includes a processor; and a memory storing an instruction executable by the processor. The processor is configured to: detect an audio output state of an audio output module in user equipment (UE); in response to the audio output module being in the audio output state, drive, via a drive module, the audio output module to move along a straight line from a first location inside a housing to a second location outside the housing; output, via the audio output module at the second location, an audio signal; and in response to the audio output module exiting the audio output state, drive, via the drive module, the audio output module to move along the straight line from the second location to the first location.

The above general description and the detailed description below are exemplary and explanatory, and do not limit the present disclosure.

BRIEF DESCRIPTION OF THE ACCOMPANYING DRAWINGS

The accompanying drawings, which are incorporated in and constitute a part of this specification, illustrate embodiments consistent with the present disclosure and, together with the description, serve to explain the principles of the present disclosure.

DETAILED DESCRIPTION

Figure 1:
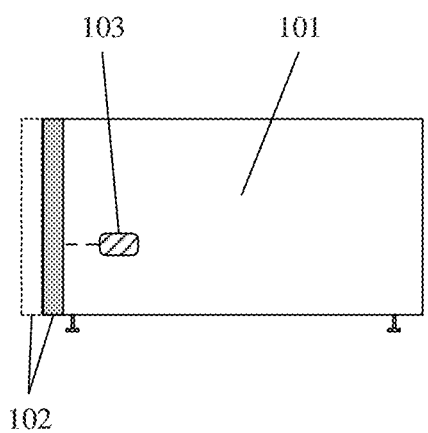
FIG. 1 is a schematic diagram of UE according to an exemplary embodiment.

Exemplary embodiments are described below and illustrated in the accompanying drawings. The following description refers to the accompanying drawings, in which the same reference numeral denotes the same or similar elements in different drawings unless indicated otherwise. Implementations set forth in the following exemplary embodiments do not represent all implementations in accordance with the disclosure. Rather, they are mere examples of the device and method in accordance with certain aspects of the subject disclosure as recited in the accompanying claims.

Terms used this disclosure are merely for describing embodiments instead of limiting the disclosure. The term "and/or" used herein may refer to and contain any combination or all possible combinations of one or more associated listed items. The terms such as "first," "second," "third" may be used merely for distinguishing information of the same type. For example, without departing from the scope of the embodiments herein, first information may also be referred to as second information. Similarly, second information may also be referred to as first information. Depending on the context, "if" used herein may be interpreted as "when" or "while" or "in response to determining that".

FIG. 1 is a schematic diagram of user equipment (UE) according to an exemplary embodiment. As shown in FIG. 1, the UE includes a housing 101, an audio output module 102, and a drive module 103 connected to the audio output module 102.

The drive module 103 is configured to drive the audio output module 102 to move along a straight line between a first location and a second location. The first location is located inside the housing 101. The second location is located outside the housing 101.

In an embodiment, the drive module 103 is configured to drive the audio output module 102 to move along the straight line to the second location when the audio output module 102 is in an audio output state.

In an embodiment, the drive module 103 is configured to drive the audio output module 102 to move along the straight line to the first location when the audio output module exits the audio output state.

In an embodiment, the UE may include, but is not limited to, mobile equipment and fixed equipment. Mobile equipment may include, but is not limited to, a laptop or a tablet computer. Fixed equipment may include, but is not limited to, a TV set or a desktop computer.

A shape of the housing 101 may be arranged according to user demand. For example, the shape of the housing 101 may be arranged to be rectangular when the UE is a TV set, which is not limited in the embodiment.

The audio output module 102 is configured to output an audio signal, so that a user may hear a sound such as music, a conversation between characters in a video, etc. The audio output module 102 is connected to the drive module 103. The audio output module 102 may move along the straight line between the first location and the second location. A trajectory of the motion along the straight line between different locations may be straight.

The motion along the straight line between the first location and the second location may include a motion along the straight line from the first location to the second location or a motion along the straight line from the second location to the first location. For example, to output an audio signal, the audio output module 102 may be driven to move outside the housing 101 along the straight line, i.e., to move along the straight line to the second location. When no audio is to be output, the audio output module 102 may be driven to move inside the housing 101 along the straight line, i.e., to move along the straight line to the first location.

Figure 2:
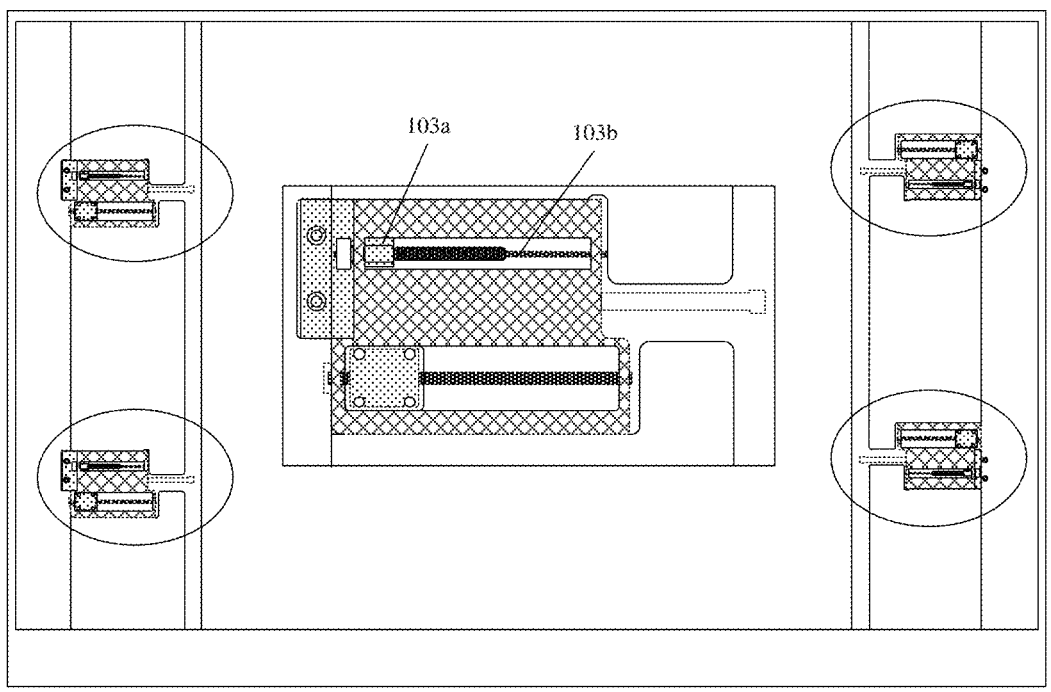
FIG. 2 is a schematic diagram of a drive module in UE according to an exemplary embodiment.

FIG. 2 is a schematic diagram of a drive module, such as the drive module 103 (FIG. 1), according to an exemplary embodiment. As shown in FIG. 2, the drive module may include a motor 103a and a motion component 103b connected to the motor 103a. Under the action of the motor 103a, the motion component 103b may drive the audio output module 102 to move along the straight line between the first location and the second location.

The motor 103a may generate rotational forces in opposite directions. The motor 103a may include, but is not limited to, a synchronous motor, an asynchronous motor, etc.

Under the action of the rotational forces generated by the motor 103a, the motion component 103b may move in opposite directions, thereby driving the audio output module 102 to move along the straight line between the first location and the second location. For example, the motion component 103b rotating in a first direction may drive the audio output module 102 to move along the straight line from the first location to the second location. The motion component 103b rotating in a second direction may drive the audio output module 102 to move along the straight line from the second location to the first location. The first direction may be opposite the second direction.

In an embodiment, the audio output module 102 in an audio output state may move along a straight line from inside the housing 101 to outside the housing 101. The audio output module 102 may output an audio signal. When exiting the audio output state, the audio output module 102 may move along the straight line from outside the housing to inside the housing. The audio output module 102 may output no audio signal.

The audio output state of the audio output module 102 may represent that the audio output module 102 is to output an audio signal. The audio output module 102 may exit the audio output state, which may represent that the audio output module 102 has no audio signal to output at the moment. In this case, the UE may be performing, on a screen of the UE, an operation that requires no sound output, such as browsing information on the UE or writing information on the UE, which is not limited in the embodiment.

In an embodiment, it may be determined whether the audio output module 102 is in the audio output state through an on off state of the UE. For example, the UE may be a TV set. If the TV set is in the on state, it may indicate that the audio output module 102 is to output an audio signal. Then, it may be determined that the audio output module 102 is in the audio output state. If the TV set is in the off state, it may indicate that the audio output module 102 has no audio signal to output. Then, it may be determined that the audio output module 102 is no longer in the audio output state.

In an embodiment, it may be detected whether the audio output module 102 is in the audio output state using a detection module, which is not limited in the embodiment. The detection module may include, but is not limited to, a sound sensor.

For example, the UE may be a TV set. The TV set may be in the on state. A user may reduce the volume to zero for the moment. Then, it may also indicate that the audio output module 102 is not in the audio output state for the moment.

Figure 3:
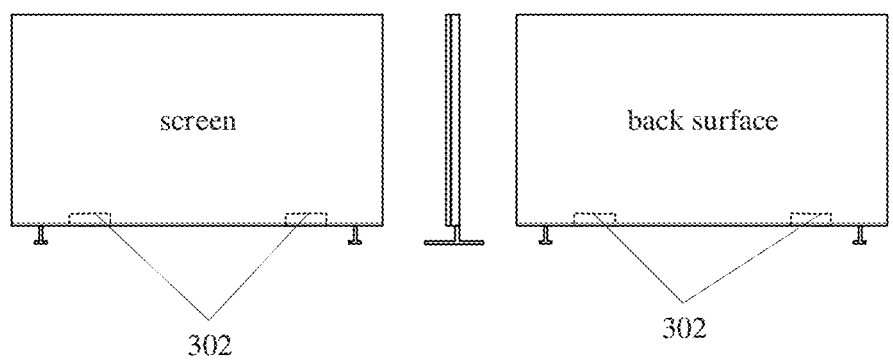
FIG. 3 is a schematic diagram of UE in related art.

FIG. 3 is a schematic diagram of UE in related art. As shown in FIG. 3, the UE may include a screen. A surface where the screen is located may be a front surface of the UE. A surface arranged opposite the surface where the screen is located may be a back surface of the UE. In the related art, an audio output module 302 is hidden inside a housing of the UF. In addition, the audio output module 302 is fixed inside the housing.

Figure 4:
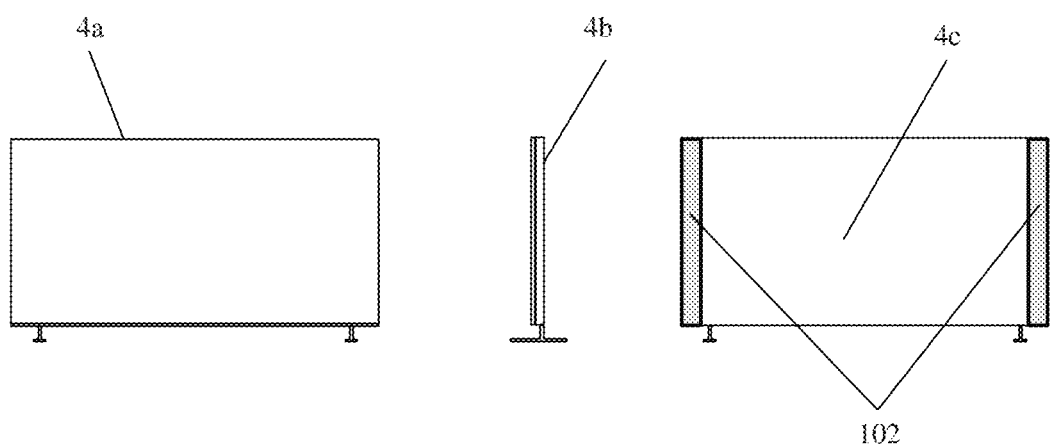
FIG. 4 is a schematic diagram of UE according to an exemplary embodiment.

FIG. 4 is a schematic diagram of UE according to an exemplary embodiment. As shown in FIG. 4, the UE may include a screen. A surface 4a where the screen is located may be a front surface of the UE, which corresponds to a front view of the UE. A surface 4c arranged opposite the surface 4a where the screen is located may be a back surface of the UE, which corresponds to a back view of the UE. The UE also has a side 4b corresponding to a side view of the UE. As may be seen from the back view, two audio output modules 102 may be arranged in the UE. When the audio output modules 102 exit the audio output state, the UE may drive, through the drive module, the audio output modules 10:2 to move along a straight line to a first location inside the housing. In this case, the audio output modules 102 may be hidden inside the housing and output no audio signal.

Figure 5:
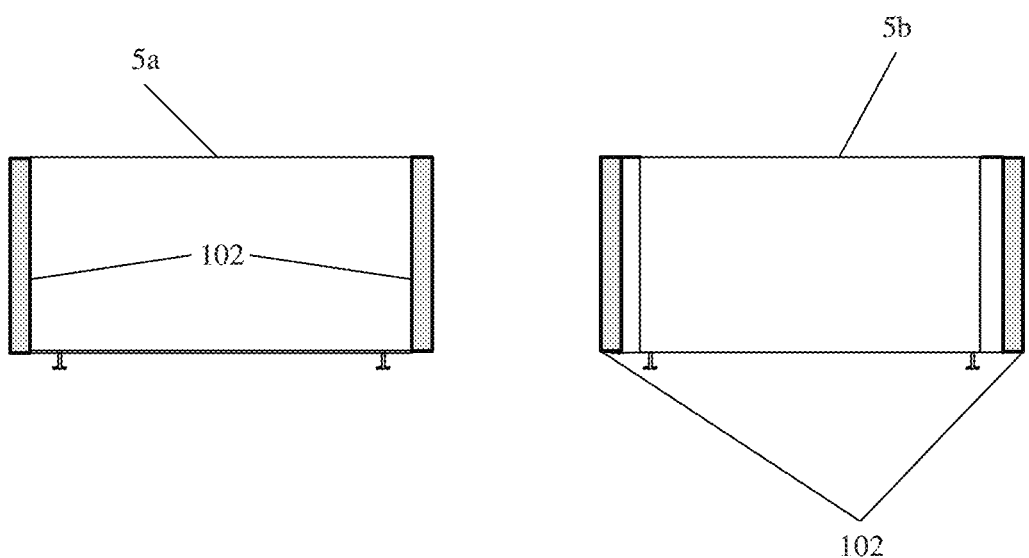
FIG. 5 is a schematic diagram of UE according to an exemplary embodiment.

FIG. 5 is a schematic diagram of UE according to an exemplary embodiment. As shown in FIG. 5, the UE may include a screen. A surface 5a where the screen is located may be a front surface of the UE, which corresponds to a front view of the UE. A surface 5b arranged opposite the surface 5a where the screen is located may be a back surface of the UE, which corresponds to a back view of the UE. Two audio output modules 102 may be arranged in the UE. As may be seen from the front view and the back view, when the audio output modules 102 are in the audio output state, the UE may drive, through the drive module, the audio output modules 102 to move along a straight line to a second location outside the housing. The two audio output modules 102 inside the UE may appear from both sides. In this case, the audio output modules 102 may output audio signals.

In the embodiments, an audio output module is driven to move along a straight line from inside the housing to outside the housing only when the audio output module is in the audio output state. Blockage of audio output may be reduced, thereby improving the result of audio output. When no audio signal is to be output, the audio output module is contained inside the housing, protecting the audio output module from possible damage due to being left outside the housing of the UE, as well as reducing space occupied by the UE. The audio output module may move along a straight line between inside the housing and outside the housing, implementing a smarter design of the audio output module, improving user experience.

Figure 6:
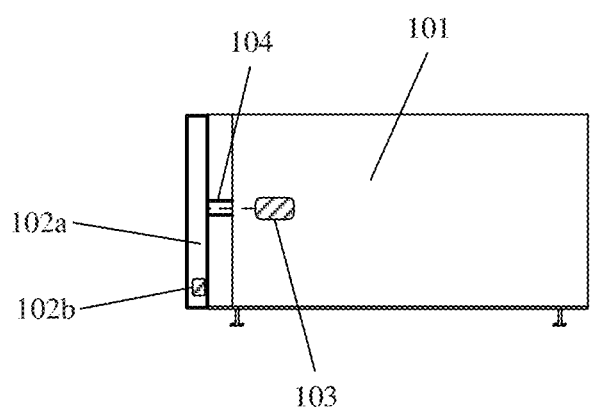
FIG. 6 is a schematic diagram of UE according to an exemplary embodiment.

FIG. 6 is a schematic diagram of UE according to an exemplary embodiment. As shown in FIG. 6, the UE may further include a guide rail 104 fixedly installed on the housing 101.

Referring to FIGS. 1 and 6, the audio output module 102 may include a mobile body 102a and an audio output component 102b installed on the mobile body 102a. The mobile body 102a may be arranged on the guide rail 104. The drive module 103 may be connected to the mobile body 102a. The drive module 103 may be adapted to driving the mobile body 102a to move along the straight line between the first location and the second location in a direction in which the guide rail 104 is arranged.

In the embodiment, the mobile body 102a may be movably connected to the housing 101. The audio output module 102 may move along a straight line in the direction in which the guide rail 104 is arranged with respect to the housing 101. When the audio output module 102 is in the audio output state, the drive module 103 may drive the mobile body 102a to move along the straight line from the first location to the second location in the direction in which the guide rail 104 is arranged. When the audio output module 102 exits the audio output state, the drive module 103 may drive the mobile body 102a to move along the straight line from the second location to the first location in the direction in which the guide rail 104 is arranged.

The guide rail 104 may be arranged as a straight guide rail. The mobile body 102a may move along a straight line on the guide rail 104. A location of the guide rail 104 with respect to the drive module 103 may be arranged as needed. For example, the drive module 103 may be arranged between two guide rails. Alternatively, a guide rail may be arranged coplanar with the drive module 103. Accordingly, the mobile body 102a is driven by a driving component to move on the guide rail 104, avoiding instability such as shaking of the audio output module while moving along the straight line on the guide rail.

Figure 7:
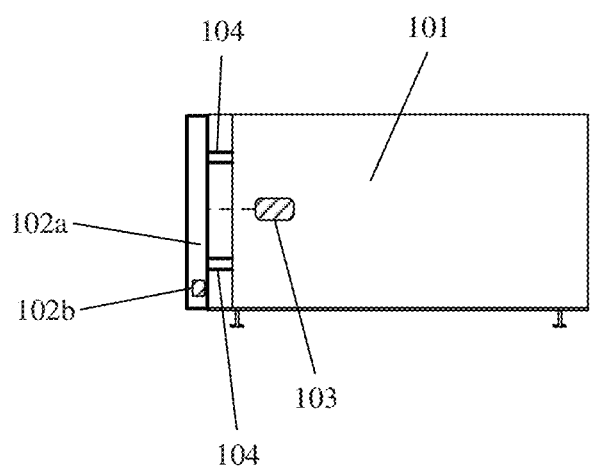
FIG. 7 is a schematic diagram of UE according to an exemplary embodiment.

FIG. 7 is a schematic diagram of UE according to an exemplary embodiment. As shown in FIG. 7, there may be two guide rails 104. The drive module 103 may be arranged between the two guide rails.

In the embodiment, two guide rails arranged on the housing may be parallel to each other. The audio output module may move along a straight line on both guide rails. The audio output module may be relatively large. The audio output module may be driven by the drive module to move along a straight line on one guide rail. In this case, the audio output module may be unstable, for example, may shake, during the motion due to arrangement of the locations of the drive module and of the guide rail. For example, the guide rail may be arranged at a location A of the audio output module. A driving force of the drive module may be applied to the audio output module at a location B. The location A and the location B may be at two opposite ends of the audio output module. In this case, when the audio output module is driven to move, the audio output module may tilt toward the location B.

Accordingly, two guide rails 104 may be arranged on the housing 101. The drive module 103 may be arranged between the two guide rails 104. Thus, when driven by the drive module 103, the audio output module 102 may move on the two guide rails 104 along a straight line stably, avoiding instability such as shaking of the audio output module while moving along the straight line.

In an embodiment, the mobile body 102a may include a first end and a second end arranged opposite the first end.

The audio output component 102b may include a first output sub-component and a second output sub-component.

The first output sub-component may be arranged at the first end and/or the second end. The first output sub-component may be configured to output an audio signal of a frequency less than a threshold.

The second output sub-component may be arranged between the first end and the second end. The second output sub-component may be configured to output an audio signal of a frequency greater than the threshold.

The first output sub-component may be configured to output an audio signal of a frequency less than a threshold. The second output sub-component may be configured to output an audio signal of a frequency greater than the threshold. That is, the first output sub-component may be configured to output a low-pitch part of an audio signal. The second output sub-component may be configured to output a high-pitch part of the audio signal.

Figure 8:
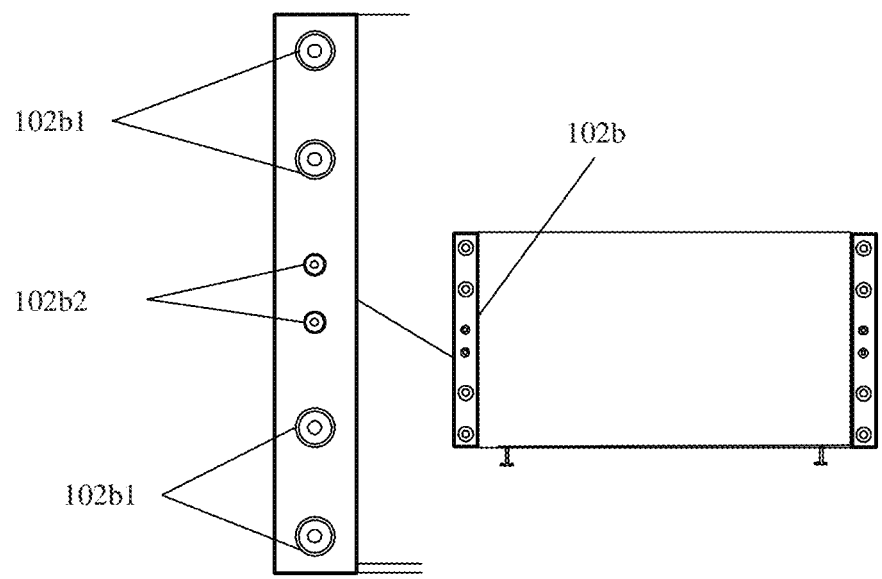
FIG. 8 is a schematic diagram of UE according to an exemplary embodiment.

FIG. 8 is a schematic diagram of UE according to an exemplary embodiment. As shown in FIG. 8, the mobile body may include a first end and a second end arranged opposite the first end.

The audio output component 102b may further include a third output sub-component 102b1 and a fourth output sub-component 102b2.

The third output sub-component 102b1 may be arranged at the first end and/or the second end.

The fourth output sub-component 102b2 may be arranged between the first end and the second end. The third output sub-component may be greater than the fourth output sub-component in terms of size. The third output sub-component may be greater than the fourth output sub-component in terms of maximum output volume.

In the embodiment, the third output sub-component 102b1 and the fourth output sub-component 102b2 may differ in size. The third output sub-component 102b1 may be greater than the fourth output sub-component 102b2 in terms of maximum output volume. Therefore, the third output sub-component 102b1 may be arranged at either end or both ends of the mobile body. The fourth output sub-component 102b2 may be arranged between the two ends of the mobile body. With alternate arrangement of the third output sub-component 102b1 and the fourth output sub-component 102b2, a higher degree of superimposition of peaks and of troughs of sound signals within one frequency band in art audio signal is implemented, thereby outputting an audio signal of a better result.

In an embodiment, the mobile body may include a first region and a second region. The audio output component may be located in the first region.

When the mobile body moves along the straight line to the first location, both the first region and the second region may be located inside the housing.

When the mobile body moves along the straight line to the second location, at least the first region may be located outside the housing.

In an embodiment, when the audio output module exits the audio output state, the mobile body may move along the straight line to the first location. The mobile body may be located entirely inside the housing. When the audio output module is in the audio output state, the mobile body may move along the straight line to the second location. In this case, the mobile body is not necessarily fully exposed outside the housing, however the first region where the audio output component is arranged may be exposed outside the housing. A region other than the first region may be hidden inside the housing.

That is, when no audio signal is to be output, the mobile body may move inside the housing along a straight line. When an audio signal is to be output, the first region of the mobile body where the audio output component is arranged may move outside the housing along a straight line.

In an embodiment, when the mobile body is located inside the housing, it may be arranged such that a distance between the first region and the second location is less than a distance between the second region and the second location. Thus, while the mobile body moves along a straight line from the first location to the second location, the first region may be the first to appear outside the housing, reducing the amount of time required for the audio output component arranged in the first region to move outside the housing along a straight line, thereby outputting an audio signal in time.

In an embodiment, the housing may further include a first surface and a second surface neighboring the first surface. The UE may further include a screen. The screen may be located on the first surface. The drive module may be configured to drive the audio output module to move along a straight line in a direction in which the second surface is arranged.

In an embodiment, there may be multiple second surfaces neighboring the first surface. The drive module may drive the audio output module to move along a straight line in a direction in which any second surface neighboring the first surface is arranged.

Figure 9:
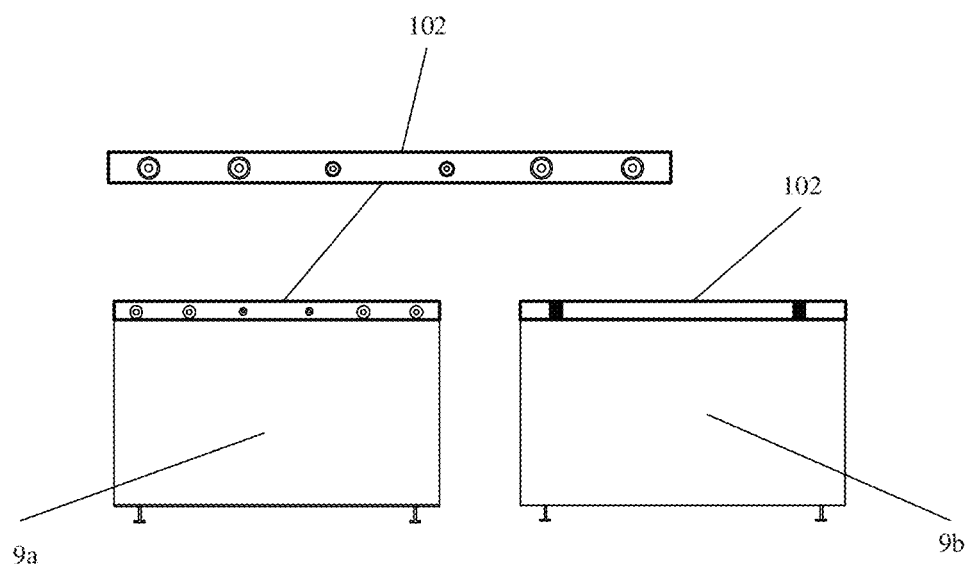
FIG. 9 is a schematic diagram of UE according to an exemplary embodiment.
Figure 10:
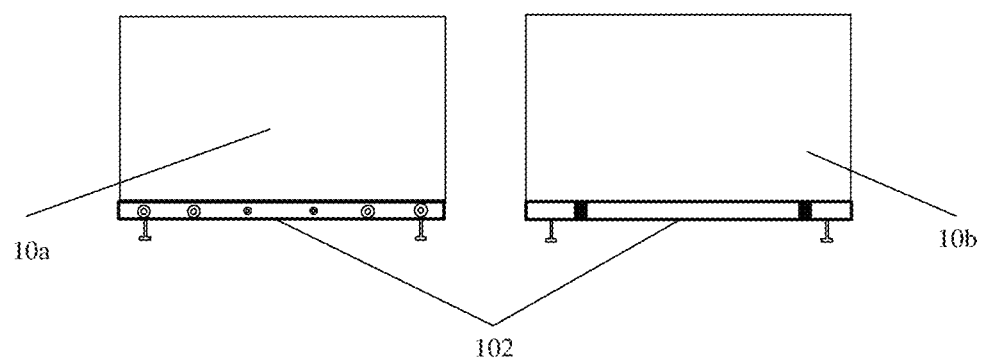
FIG. 10 is a schematic diagram of UE according to an exemplary embodiment.

FIG. 9 and FIG. 10 are schematic diagram of UE according to exemplary embodiments. As shown in FIG. 9 and FIG. 10, the UE may include a screen. A first surface 9a (FIG. 9) or 10a (FIG. 10) where the screen is located may be a front surface of the UE, which corresponds to a front view of the UE. A surface 9b (FIG. 9) or 10b (FIG. 10) arranged opposite the surface 9a (FIG. 9) or 10a (FIG. 10) where the screen is located may be a hack back surface of the UE, which corresponds to a back view of the UE. A second surface may be any of four surfaces neighboring the first surface where the screen is located. The audio output module may move outside the housing along a straight line in a direction in which any of the four second surfaces is arranged.

In FIG. 9, as may be seen from the front view and the back view of the UE, the audio output module 102 may move to the outside of the housing along a straight line in a direction in which one second surface is arranged.

In FIG. 10, as may be seen from the front view and the back view of the UE, the audio output module 102 may move to the outside of the housing along a straight line in a direction in which another second surface is arranged.

Figure 11:
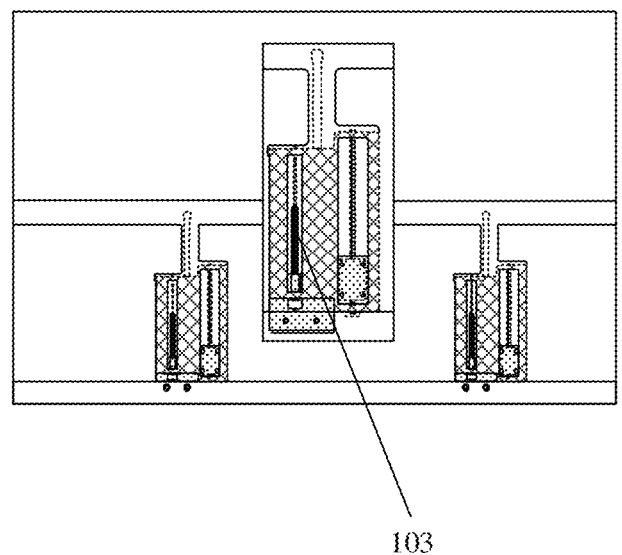
FIG. 11 is a schematic diagram of a drive module in UE according to an exemplary embodiment.
Figure 12:
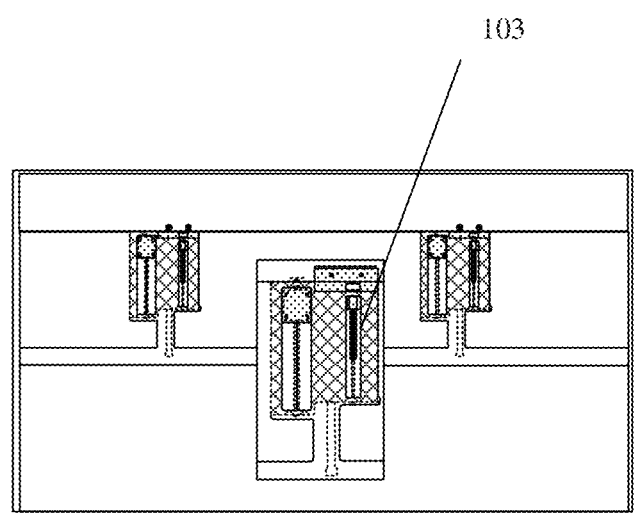
FIG. 12 is a schematic diagram of a drive module in UE according to an exemplary embodiment.

FIG. 11 and FIG. 12 are schematic diagrams of a drive module in UE, such as the drive module 103, according to exemplary embodiments. When a second surface is arranged in a direction as shown in FIG. 9, the drive module 103 may be arranged in a direction as shown in FIG. 11. When a second surface is arranged in a direction as shown in FIG. 10, the drive module 103 may be arranged in a direction as shown in FIG. 12.

In the above embodiments, the audio output module may move outside the housing along a straight line from different surfaces inside the housing, in a flexible mode, improving user experience.

In an embodiment, the housing may further include a first surface and two second surfaces neighboring the first surface.

The UE may further include a screen. The screen may be located on the first surface.

The audio output module may include two audio output modules corresponding respectively to the two second surfaces.

The drive module may be configured to drive each of the two audio output modules to move along a straight line in a direction in which a second surface corresponding to the each of the two audio output modules is arranged.

In an embodiment, multiple second surfaces may neighbor the first surface. The drive module may drive the audio output module to move along a straight line in directions in which any two second surfaces neighboring the first surface are respectively arranged.

As shown in FIG. 5, the two second surfaces may be any two of four surfaces neighboring the first surface. The two second surfaces may be arranged opposite each other. Each of two audio output modules may be located on a corresponding second surface corresponding to the each of the two audio output modules, and may be driven simultaneously by the drive module to move outside the housing along a straight line in a direction in which the corresponding second surface is arranged.

Accordingly, two audio output modules are arranged on the UE. When the audio output modules are in the audio output state, the audio output modules appear from two sides of the screen and output audio signals. Compared to the case where only one audio output module is arranged, arrangement of two audio output modules may allow superimposition of audio signals generated by the UE, improving a result of audio signal output.

Figure 13:
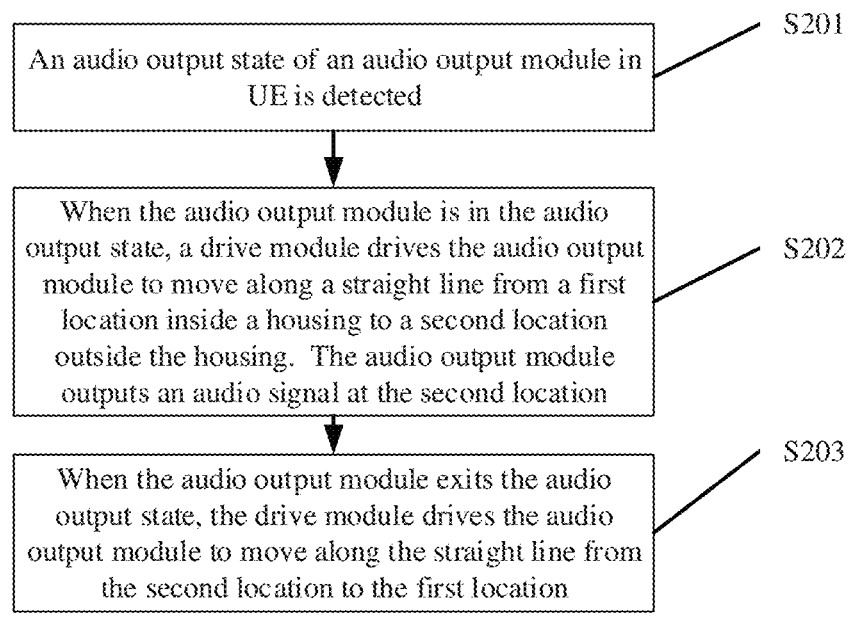
FIG. 13 is a flowchart of a method for outputting audio according to an exemplary embodiment.

FIG. 13 is a flowchart of a method for outputting audio according to an exemplary embodiment. As shown in FIG. 13, the method may include the following steps.

In S201, an audio output state of an audio output module in UE is detected.

In S202, when the audio output module is in the audio output state, a drive module drives the audio output module to move along a straight line from a first location inside a housing of the UE to a second location outside the housing. The audio output module outputs an audio signal at the second location.

In S203, when the audio output module exits the audio output state, the drive module drives the audio output module to move along the straight line from the second location to the first location.

In the embodiment, compared to hiding an audio output module inside a housing, the location of the audio output module is adjusted according to the audio output state of the audio output module, such that the audio output module appears outside the housing when outputting an audio signal, reducing blockage of audio output, thereby improving the result of audio output. When no audio signal is to be output, the audio output module is contained inside the housing, protecting the audio output module from possible damage due to being left outside the housing of the UE, as well as reducing space occupied by the UE. The audio output module may move along a straight line between inside the housing and outside the housing, implementing a smarter design of the audio output module, improving user experience.

In an embodiment, the drive module may drive the audio output module to move along the straight line from the first location inside the housing to the second location outside the housing as follows. A mobile body of the audio output module may be driven by the drive module to move along the straight line from the first location inside the housing to the second location outside the housing in a direction in which a guide rail fixed on the housing is arranged.

In an embodiment, the drive module may drive the audio output module to move along the straight line from the second location to the first location as follows. A mobile body of the audio output module may be driven by the drive module to move along the straight line from the second location to the first location in a direction in which a guide rail fixed on the housing is arranged.

Figure 14:
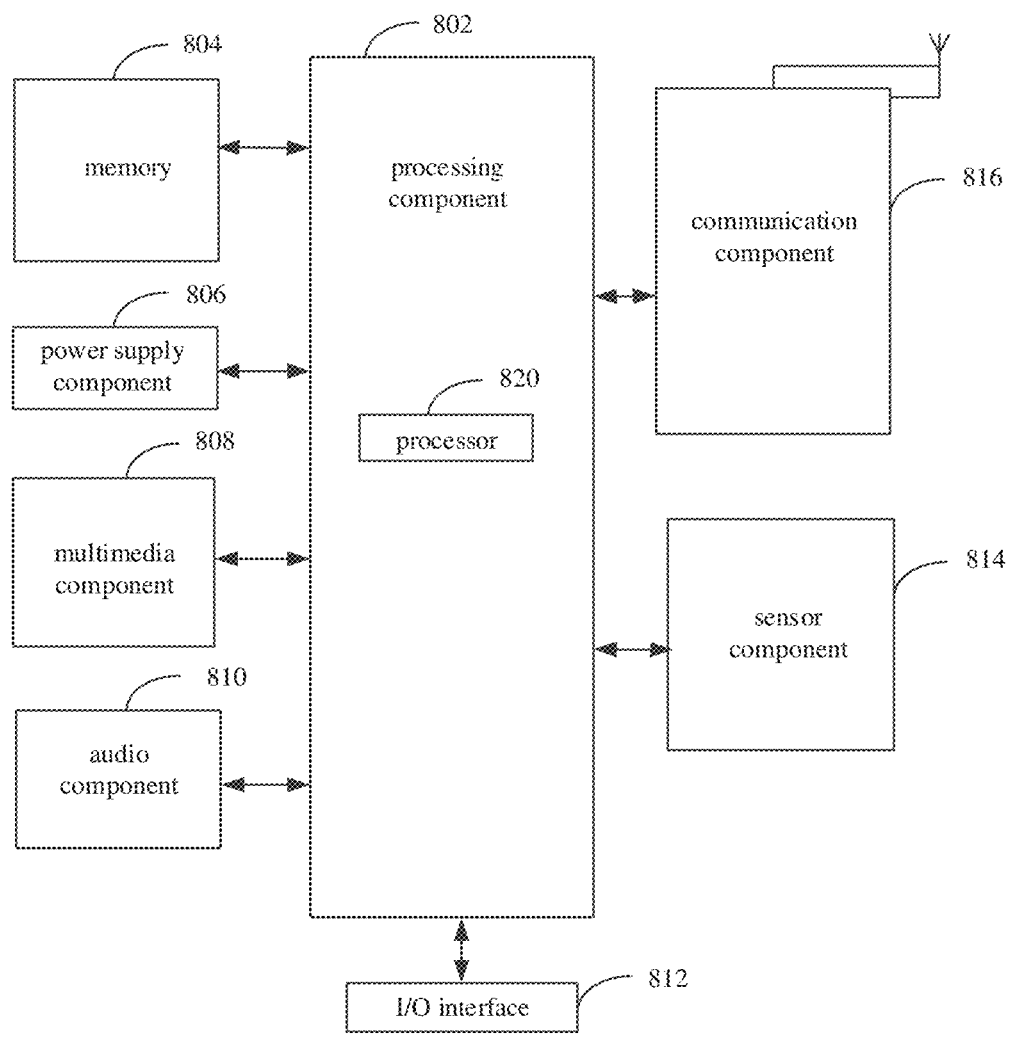
FIG. 14 is a block diagram of UE according to an exemplary embodiment.

FIG. 14 is a block diagram of UE according to an exemplary embodiment. For example, the UE may be a mobile phone, a computer, digital broadcast UE, message transceiver equipment, a gaining console, tablet equipment, medical equipment, fitness equipment, a Personal Digital Assistant, etc.

Referring to FIG. 14, the UE may include one or more of a processing component 802, memory 804, a power supply component 806, a multimedia component 808, an audio component 810, an Input/Output (I/O) interface 812, a sensor component 814, a communication component 816, etc.

The processing component 802 may generally control an overall operation of the UE, such as operations associated with display, a telephone call, data communication, a camera operation, a recording operation, etc. The processing component 802 may include one more processors 820 to execute instructions so as to complete all or some steps of the method. In addition, the processing component 802 may include one or more modules to facilitate interaction between the processing component 802 and other components. For example, the processing component 802 may include a multimedia module to facilitate interaction between the multimedia component 808 and the processing component 802.

The memory 804 may be adapted to storing various types of data to support the operation at the UE. Examples of such data may include instructions of any application or method adapted to operating on the UE, contact data, phone book data, messages, pictures, videos, etc. The memory 804 may be realized by any type of transitory or non-transitory storage equipment or combination thereof, such as Static Random Access Memory (SRAM), Electrically Erasable Programmable Read-Only Memory (EEPROM). Erasable Programmable Read-Only Memory (EPROM), Programmable Read-Only Memory (PROM), Read-Only Memory (ROM), magnetic memory, flash memory, a magnetic disk, or a compact disk.

The power supply component 806 may supply electric power to various components of the UE. The power supply component 806 may include a power management system, one or more power sources, and other components related to generating, managing and distributing electricity for the UE.

The multimedia component 808 may include a screen providing an output interface between the UE and a user. The screen may include a Liquid Crystal Display (LCD), a Touch Panel (TP), etc. If the screen includes a TP, the screen may be realized as a touch screen to receive an input signal from a user. The TP may include one or more touch sensors for sensing touch, slide and gestures on the TP. The touch sensors not only may sense the boundary of a touch or slide move, but also detect the duration and pressure related to the touch or slide move. The multimedia component 808 may include a front camera and/or a rear camera. When the UE is in an operation mode such as a photographing mode or a video mode, the front camera and/or the rear camera may receive external multimedia data. Each of the front camera or the rear camera may be a fixed optical lens system or may have a focal length and be capable of optical zooming.

The audio component 810 may be adapted to outputting and/or inputting an audio signal. For example, the audio component 810 may include a microphone (MIC). When e UE is in an operation mode such as a call mode, a recording mode, and a voice recognition mode, the MIC may be adapted to receiving an external audio signal. The received audio signal may be further stored in the memory 804 or may be sent via the communication component 816. The audio component 810 may further include a loudspeaker adapted to outputting the audio signal.

The I/O interface 812 may provide an interface between the processing component 802 and a peripheral interface module. Such a peripheral interface module may be a keypad, a click wheel, a button, and/or the like. Such a button may include but is not limited to: a homepage button, a volume button, a start button, and a lock button.

The sensor component 814 may include one or more sensors for assessing various states of the UE. For example, the sensor component 814 may detect an on/off state of the UE and relative positioning of components such as the display and the keypad of the UE. The sensor component 814 may further detect a change in the position of the UE or of a component of the UE, whether there is contact between the UE and a user, the orientation or acceleration/deceleration of the UE, a change in the temperature of the UE. The sensor component 814 may include a proximity sensor adapted to detecting existence of a nearby object without physical contact. The sensor component 814 may further include an optical sensor such as a Complementary Metal-Oxide-Semiconductor (CMOS) or a Charge-Coupled-Device (CCD) image sensor used in an imaging application. The sensor component 814 may further include an acceleration sensor, a gyroscope sensor, a magnetic sensor, a distance sensor, a pressure sensor, or a temperature sensor.

The communication component 816 may be adapted to facilitating wired or wireless communication between the UE and other equipment. The UE may access a wireless network based on a communication standard such as Wi-Fi, 4G, 5G, or combination thereof. The communication component 816 may broadcast related information or receive a broadcast signal from an external broadcast management system via a broadcast channel. The communication component 816 may further include a Near Field Communication (NFC) module for short-range communication. For example, the NFC module may be based on technology such as Radio Frequency Identification (RFID), Infrared Data Association (IrDA), Ultra-Wideband (UWB) technology, Bluetooth (BT), etc.

The UE may be realized by one or more electronic components such as an Application Specific Integrated Circuit (ASIC), a Digital Signal Processor (DSP), a Digital Signal Processing Device (DSPD), a Programmable Logic Device (PLD), a Field Programmable Gate Array (FPGA), a controller, a microcontroller, a microprocessor, etc., to implement the method.

In an exemplary embodiment, there is provided a non-transitory computer-readable storage medium including instructions, such as the memory 804 including instructions. The instructions may be executed by the processor 820 of the UE to implement the above described methods. For example, the computer-readable storage medium may be Read-Only Memory (ROM), Random Access Memory (RAM), Compact Disc Read-Only Memory (CD-ROM), a magnetic tape, a floppy disk, optical data storage equipment, and/or the like.

Other embodiments of the present disclosure will be apparent to one skilled in the art after considering the present disclosure and practiced the invention disclosed herein. This application is intended to cover any variation, use, or adaptation of the present disclosure following the general principle of the present disclosure and including such departures from the present disclosure as come within known or customary practice in the art. The present disclosure and its embodiments are exemplary only, with a true scope and spirit of the present disclosure being indicated by the appended claims.

The present disclosure is not limited to the exact construction that has been described above and illustrated in the accompanying drawings. Various modifications and changes can be made without departing from the scope of the present disclosure. It is intended that the scope of the present disclosure be defined only by the appended claims.

What is claimed is:

1. User equipment (UE), comprising:
    a housing;
    an audio output module;
    a drive module connected to the audio output module and configured to:
        drive the audio output module to move along a straight line between a first location and a second location, the first location being located inside the housing, the second location being located outside the housing,
        in response to detecting, by a detection module, a non-zero volume of the UE, drive the audio output module to move along the straight line to the second location, and
        in response to detecting, by the detection module, a zero volume of the UE, drive the audio output module to move along the straight line to the first location; and
    a guide rail fixedly installed on the housing,
    wherein the audio output module comprises a mobile body and an audio output component installed on the mobile body,
    the mobile body is arranged on the guide rail, and
    the drive module is connected to the mobile body, and is further configured to drive the mobile body to move along the straight line between the first location and the second location in a direction in which the guide rail is arranged,
    wherein the mobile body comprises a first region and a second region, and the audio output component is located in the first region,
    when the mobile body moves along the straight line to the first location, the first region and the second region are located inside the housing,
    when the mobile body moves along the straight line to the second location, at least the first region is located outside the housing, and
    when the mobile body is located inside the housing, a distance between the first region and the second location is less than a distance between the second region and the second location.

2. The UE of claim 1, wherein:
    the mobile body comprises a first end and a second end arranged opposite the first end,
    the audio output component comprises a first output sub-component and a second output sub-component,
    the first output sub-component is arranged at at least one of the first end or the second end and is configured to output an audio signal of a frequency less than a threshold, and
    the second output sub-component is arranged between the first end and the second end, and is configured to output an audio signal of a frequency greater than the threshold.

3. The UE of claim 1, wherein:
    the mobile body comprises a first end and a second end arranged opposite the first end,
    the audio output component comprises a third output sub-component and a fourth output sub-component,
    the third output sub-component is arranged at at least one of the first end or the second end, and
    the fourth output sub-component is arranged between the first end and the second end,
    wherein the third output sub-component has a greater size than the fourth output sub-component, and the third output sub-component has a greater maximum output volume than the fourth output sub-component.

4. The UE of claim 1, wherein the housing further comprises a first surface and a second surface neighboring the first surface, and the UE further comprises a screen located on the first surface, and
    wherein the drive module is configured to drive the audio output module to move along a straight line in a direction in which the second surface is arranged.

5. The UE of claim 1, wherein the housing further comprises a first surface and two second surfaces neighboring the first surface, and the UE further comprises a screen located on the first surface,
    wherein the audio output module comprises two audio output modules corresponding respectively to the two second surfaces, and
    wherein the drive module is configured to drive each of the two audio output modules to move along a straight line in a direction in which a second surface corresponding to the each of the two audio output modules is arranged.

6. A method for outputting audio, comprising:
    detecting, by a detection module, a volume of user equipment (UE);
    in response to detecting, by the detection module, a non-zero volume of the UE, driving, via a drive module of the UE that is connected to an audio output module, the audio output module to move along a straight line from a first location inside a housing of the UE to a second location outside the housing, wherein the driving comprises driving, via the drive module, a mobile body of the audio output module to move along the straight line from the first location inside the housing to the second location outside the housing in a direction in which a guide rail fixedly installed on the housing is arranged;
    outputting, via the audio output module at the second location, an audio signal; and in response to detecting, by the detection module, a zero volume of the UE, driving, via the drive module, the audio output module to move along the straight line from the second location to the first location, wherein the driving comprises driving, via the drive module, the mobile body of the audio output module to move along the straight line from the second location to the first location in the direction in which the guide rail fixedly installed on the housing is arranged, wherein the audio output module comprises an audio output component installed on the mobile body, wherein the mobile body comprises a first region and a second region, and the audio output component is located in the first region, when the mobile body moves along the straight line to the first location, the first region and the second region are located inside the housing, when the mobile body moves along the straight line to the second location, at least the first region is located outside the housing, and when the mobile body is located inside the housing, a distance between the first region and the second location is less than a distance between the second region and the second location.

7. A device for outputting audio, comprising:

a processor; and a memory storing an instruction executable by the processor, wherein the processor is configured to:

detect, by a detection module, a volume of user equipment (UE);

in response to detecting, by the detection module, a non-zero volume of the UE, drive, via a drive module of the UE that is connected to an audio output module, the audio output module to move along a straight line from a first location inside a housing of the UE to a second location outside the housing, wherein driving the audio output module comprises driving, via the drive module, a mobile body of the audio output module to move along the straight line from the first location inside the housing to the second location outside the housing in a direction in which a guide rail fixedly installed on the housing is arranged;

output, via the audio output module at the second location, an audio signal; and in response to detecting, by the detection module, a zero volume of the UE, drive, via the drive module, the audio output module to move along the straight line from the second location to the first location, wherein driving the audio output module comprises driving, via the drive module, the mobile body of the audio output module to move along the straight line from the second location to the first location in the direction in which the guide rail fixedly installed on the housing is arranged, wherein the audio output module comprises an audio output component installed on the mobile body, wherein the mobile body comprises a first region and a second region, and the audio output component is located in the first region, when the mobile body moves along the straight line to the first location, the first region and the second region are located inside the housing, when the mobile body moves along the straight line to the second location, at least the first region is located outside the housing, and when the mobile body is located inside the housing, a distance between the first region and the second location is less than a distance between the second region and the second location.

* * * * *